(12) United States Patent
Azimi et al.

(10) Patent No.: US 7,948,914 B2
(45) Date of Patent: May 24, 2011

(54) POWER LEARNING SECURITY IN WIRELESS ROUTERS

(75) Inventors: Kouros Azimi, Center Valley, PA (US);
Mohammad Mobin, Orefield, PA (US);
Roger Fratti, Mohnton, PA (US);
Sailesh Merchant, Macungie, PA (US);
Kenneth Paist, Spring City, PA (US)

(73) Assignee: Agere Systems Inc., Allentown, PA (US)

( * ) Notice: Subject to any disclaimer, the term of this patent is extended or adjusted under 35 U.S.C. 154(b) by 44 days.

(21) Appl. No.: 12/322,028

(22) Filed: Jan. 28, 2009

(65) Prior Publication Data
US 2010/0188987 A1   Jul. 29, 2010

(51) Int. Cl.
*G01R 31/08* (2006.01)
(52) U.S. Cl. ............... 370/252; 370/318; 455/422.1
(58) Field of Classification Search .......... 370/200–254, 370/272–390, 431–546; 455/421–461, 410–411
See application file for complete search history.

(56) References Cited

U.S. PATENT DOCUMENTS

| 7,565,152 | B2* | 7/2009 | Gandhi et al. ............. 455/453 |
| 2002/0067701 | A1* | 6/2002 | Chen et al. .................. 370/318 |
| 2002/0142774 | A1* | 10/2002 | Saint-Hilaire et al. ........ 455/445 |
| 2004/0028017 | A1* | 2/2004 | Whitehill et al. ............. 370/338 |
| 2005/0020256 | A1* | 1/2005 | Peikari ...................... 455/422.1 |
| 2005/0058151 | A1* | 3/2005 | Yeh ............................ 370/445 |
| 2006/0109923 | A1* | 5/2006 | Cai et al. ..................... 375/260 |

* cited by examiner

*Primary Examiner* — Ricky Ngo
*Assistant Examiner* — Iqbal Zaidi

(57) ABSTRACT

In described embodiments, elements of a wireless home network employ learned power security for the network. An access point, router, or other wireless base station emits and receives signals having corresponding signal strengths. Wireless devices coupled to the base station through a radio link are moved through the home network at boundary points of the home and the signal strength is measured at each device and communicated to the base station. Based on the signal strength information from the emitted signals measured at the boundary points and/or from measured signal strength information of signals received from the boundary points, the base station determines a network secure area. The base station declines permission of devices attempting to use or join the home network that exhibit signal strength characteristics less than boundary values for the network secure area.

13 Claims, 3 Drawing Sheets

100

POWER LEARNING SECURITY IN WIRELESS ROUTERS

BACKGROUND OF THE INVENTION

1. Field of the Invention

The present invention relates to network security, and, in particular, to network security in wireless home networks.

2. Description of the Related Art

Wireless networks are increasingly found in the home, with most wireless networks operating in accordance with one or more of the 802.11 family of wireless networking standards. The core of a Wi-Fi home network is an access point (AP) or router that coordinates the communication over wireless radio links with one or more wireless devices (BSs, or basic subscribers), such as a laptop or other computer with other BSs or a landline (or other backbone) network such as the Internet. To set up an AP or router, manufacturers provide Web pages accessed from a local PC coupled to the AP or router, which allow owners to enter their network address and account information. These Web tools are secured with a login screen usually having a username and password. However, for any given piece of equipment, the logins provided are simple, very well-known to hackers on the Internet, and, consequently, easy to break.

All Wi-Fi equipment supports some form of encryption technology that scrambles messages sent over the wireless radio link. Several encryption technologies exist for Wi-Fi today, but all Wi-Fi devices on a given network must share identical encryption settings, requiring the use of a a "lowest common denominator" encryption setting for the network devices.

APs and routers all use a network name called an "SSID" for network device identification. Manufacturers normally ship their products with the same SSID set. Knowing the SSID does not by itself allow a hacker to break into a network, but knowledge of the SSID is a starting point for hackers attempting to break into the network. In Wi-Fi networking, the AP or router typically broadcasts the network name (SSID) over the air at regular intervals to support roaming where Wi-Fi users may roam in and out of range of a network. In home Wi-Fi networks, this roaming feature is unnecessary, and it increases the likelihood an intruder or hacker might attempt to log into the home network. Most Wi-Fi APs allow for disabling of the SSID broadcast by the home network administrator.

Each piece of Wi-Fi equipment also possesses a unique identifier called the physical address or MAC address. APs and routers keep track of the MAC addresses of all devices that connect to them. Many such products offer the owner an option to key in the MAC addresses of their home equipment to restrict the network to only allow connections from those devices. However, software programs employed by hackers might be written so as to read and fake MAC addresses easily. In addition, most home networks use dynamic IP addresses, or "DHCP" that also weaken network security by allowing network hackers to easily obtain valid IP addresses from your network's DHCP pool. Network APs and routers also contain built-in firewall capability, but the option also exists to disable them.

Wi-Fi signals normally reach to the exterior of a home. A small amount of signal leakage outdoors is not a problem, but the further this signal reaches, the easier it is for hackers to detect and exploit the signal. Wi-Fi signals often reach through neighboring homes and into streets, for example. When installing a wireless home network, the position of the access point or router determines its reach. Often, a user attempts to position the AP or router device near the center of the home, rather than near windows, to minimize leakage of the network's signals to the home's exterior.

SUMMARY OF THE INVENTION

In one embodiment, the present invention provides for learned power security in a wireless network. A base station transmits a signal to one or more remote devices at corresponding locations in an area; and the remote device at each location in the area measures a received signal strength of the signal transmitted by the base station. Each location is substantially near an outer boundary of the area. The remote device communicates to the base station the received signal strength at the corresponding location of the remote device. The base station defines an authentication perimeter for the area by setting a transmit signal power of the base station based on the received signal strength at each location.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In described embodiments, elements of a wireless home network employ learned power security for the network. An access point, router, or other wireless base station (collectively termed herein as a "base station") emits and receives signals having corresponding signal strengths. Wireless devices (collectively termed herein as "remote devices") coupled to the base station through a radio link are moved through the home network at boundary points of the home. The signal strength is measured at each remote device at boundary points of the home and each signal strength communicated to the base station. Based on the signal strength information from the emitted signals measured at the boundary points and/or from measured signal strength information of signals received from the remote devices at the boundary points, the base station determines a network secure area. The base station prevents devices attempting to use or join the home network since the signal strength characteristics are less than boundary values for sustained network communication. In addition, the base station declines permission of devices attempting to use or join the home network that exhibit signal strength characteristics less than boundary values for the network secure area.

Figure 1:
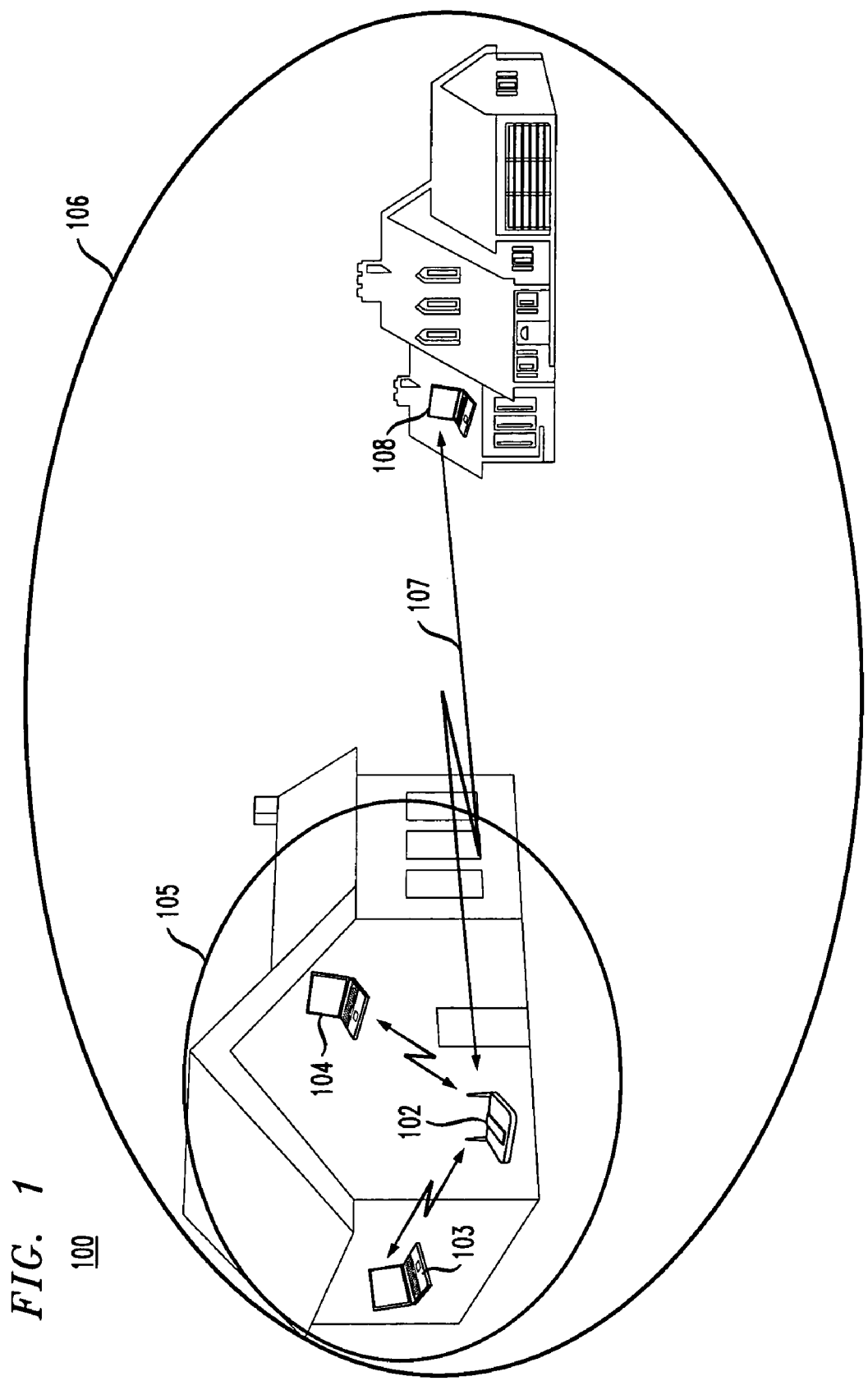
FIG. 1 shows a home network employing learned power security in accordance with an exemplary embodiment of the present invention.

FIG. 1 shows a home network 100 employing learned power security in accordance with an exemplary embodiment of the present invention. Network 100 includes base station 102 communicating over a wireless medium to remote units 103 and 104. Base station 102 might preferably communicate with remote units 103 and 104 in a manner conforming to one or more of the 802.11 wireless communication standards, but the present invention is not so limited. One skilled in the art might extend the teachings herein to other types of wireless networks, such as Bluetooth or wide area networks, in which the base station and remote units might exchange information related to received signal strength and, in some cases, specific geographic location information, such as provided through the global positioning system (GPS).

As described subsequently, network 100 employs learned power security that establishes an authenticated perimeter 105 for allowed device connectivity. Base station 102 adjusts its transmit power, and, in some embodiments, the shape of the antenna beams of its transmit antennae, to create authenticated perimeter 105. Authenticated perimeter 105 might preferably be configured so as to substantially allow communication between the base station and remote devices within authenticated perimeter 105, while substantially prevent communication with devices outside of authenticated perimeter 105. Perimeter 105 might preferably be configured so as to substantially cover a user home, as shown in FIG. 1. In the absence of learned power security, base station 102 might create an unauthenticated perimeter 106, allowing undesired communication 107 with remote device 108 operated by, for example, a hacker attempting to access network 100.

Base station 102 and remote devices 103 and 104 establish authenticated perimeter 105 by remote devices 103 and 104 measuring received signal strength, or power, at various locations within a desired area, such as a home as shown in FIG. 1. For such establishment, remote devices 103 and 104 are preferably known to base station 102 as secure devices uniquely or previously associated with base station 102. Base station need not measure signal strength directly, but might also receive information with respect to bit error rate of a wireless communication link and/or delay of signals transmitted through the link. For the 802.11 family of standards, for example, remote devices 103 and 104 might employ a received signal strength indicator (RSSI) value.

Consequently, base station 102 transmits a signal to, for example, remote device 104. Remote device 104 measures the RSSI value corresponding to the received signal from base station 102 and then communicates this RSSI value back to base station 102. Base station 102 then adjusts its transmit power for establishment of perimeter 105. The process might be an iterative process which is repeated until a threshold value is reached that can sustain acceptable wireless communication between base station 102 and remote device 104.

Since many remote devices might exist in the home, for example, base station 102 might adjust its procedure to account for varying distances of remote devices. For example, base station 102 might simply determine the lowest necessary transmit power that enables satisfactory communication with each of remote devices 103 and 104. In such case, it might be preferable that base station 102 be located relatively near the center of authenticated perimeter 105.

Alternatively, a user might employ a single remote device and move the remote device throughout an area for which the user desires to establish an authenticated perimeter. At each location, such as upstairs, downstairs and at each boundary wall of a home, the remote device is placed in communication with the base station. The base station thus receives information corresponding to received signal strength at multiple locations within the area, and might set its transmit signal strength in accordance with the teachings described herein to set the authenticated perimeter.

In cases where base station 102 is not necessarily located near the center of authenticated perimeter 105, base station 102 might measure received signal strength from each of remote devices 103 and 104. Received signal strength from each of remote devices 103 and 104 might be employed to by base station 102 to generate an estimate of the distances between base station 102 and each of remote devices 103 and 104. Based on these estimated distances, base station 102 might generate a map of the area to be covered by the wireless medium as the authenticated perimeter 105.

In addition, delay of the signal transmitted from a remote device and the base station might be employed to estimate distance between the remote device and base station. When using delay as a basis for distance calculation, random system delays should be accounted for. For example, 802.11 systems include a beacon signal from a base station used as a timing reference. 802.11 systems also employ a random back-off by remote devices for retransmission to prevent recurring collisions when accessing the medium. Such random back-off should be deactivated to allow for distance calculations based on signal delay during the process of setting an authentication perimeter.

Some Wi-Fi systems, such as those conforming to the 802.11n standard, for improved security of home based systems, use Multiple-Input, Multiple Output (MIMO) transmission using multiple antennas. Embodiments of the present invention might overlay standard security measures with adaptive and programmable power control. Consequently, more complex systems might employ a multiple antenna design in base station 102, enabling base station 102 to implement beam forming techniques. Beam forming techniques are well known in the art of radio communications for configuring the directivity of an antenna.

For example, base station might determine a first transmit power level for desired communication performance with remote device 103 and a second transmit power level for desired communication performance with remote device 104. Base station 102 then employs beam forming to modify the coverage of the wireless medium to provide the first transmit signal power level at the location of remote device 103 and the second transmit signal power level at the location of remote device 104. Accuracy of this technique might be enhanced through use of GPS.

If GPS information is available, and one or more of remote devices 103 and 104 is configured to determine its location within an predefined area through GPS information, then this GPS information might be employed by base station 102 to create a map of the area to be included within authenticated perimeter 105. Remote devices 103 and 104 each receive and measure signal strength from base station 102, but, when communicating the signal strength information to base station 102, remote devices 103 and 104 also include their respective locations. Base station 102 creates a map of the area in which remote devices 103 and 104 operate, and determines authenticated perimeter 105 from the map. Base station 102 then adjusts the coverage of the wireless medium provided by the particular implementation of its antenna design to conform its transmit signal power level to a given threshold at each location to the boundaries of the map, thus establishing authenticated perimeter 105.

Figure 2:
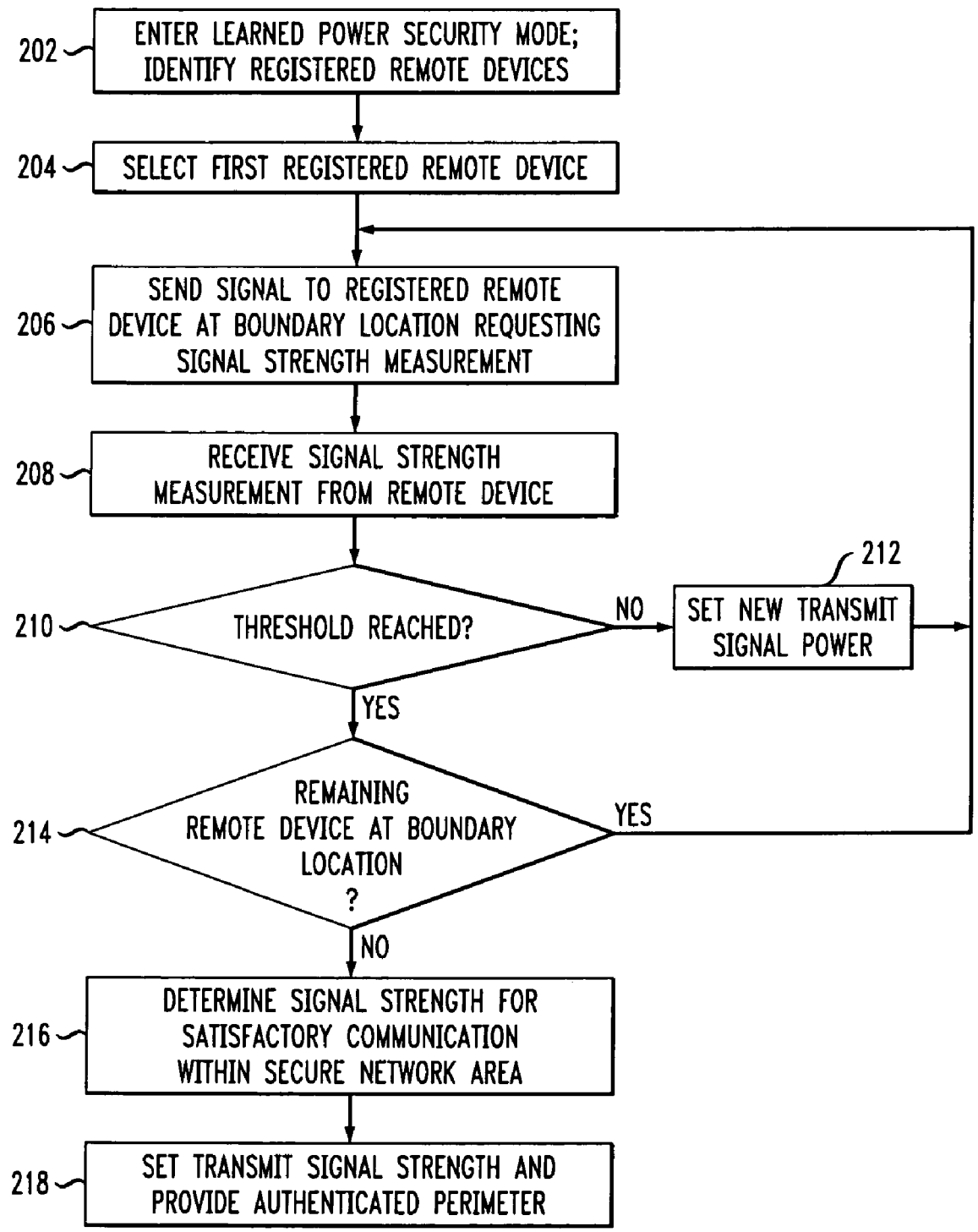
FIG. 2 shows an exemplary method of measuring and communicating boundary point signal strength characteristics to determine a network secure area in accordance with an exemplary embodiment of the present invention.

FIG. 2 shows an exemplary method of measuring and communicating boundary (point) location signal strength characteristics to determine a network secure area in accordance with an exemplary embodiment of the present invention. At step 202, the base station begins a learned power security routine ("mode"), identifying one or more remote devices registered to the home network at the desired boundary locations of the home secure network. One skilled in the art might readily modify the order of steps in FIG. 2 such that the method might perform the steps described with respect to FIG. 2 if a single remote device is employed and moved through the desired boundary locations. The first registered remote device is selected at step 204.

At step 206, the base station sends a signal to the selected registered device at the boundary location. At step 208, the base station receives an acknowledgement signal from the selected remote device containing a value indicating the received signal strength (e.g., RSSI) seen at the selected remote device. The base station might also measure signal strength and delay information of the signal that is transmitted from the selected remote device to the base station. Alternatively, the base station might instruct the remote devices to transmit a signal at a signal strength requested by the base station so that the base station might then measure the received signal's strength and compare it to the desired signal strength.

At step 210, a test determines whether the received signal strength seen at the selected remote device is at a minimum threshold to sustain communication at a desired quality level for the secure home network. If the test of step 210 determines that the received signal strength seen at the selected remote device is above the minimum threshold to sustain communication at a desired quality level, at step 212, the base station sets the transmit signal strength to a new value approaching the minimum threshold, and returns to step 206. If the test of step 210 determines that the received signal strength seen at the selected remote device corresponds to the minimum threshold to sustain communication at a desired quality level, at step 212, the method advances to step 214.

A test at step 214 determines whether additional registered remote devices should be processed. If the test of step 214 determines that additional registered remote devices should be processed, the next remote device is selected and the method returns to step 206. If the test of step 214 determines that no additional registered remote devices should be processed, the method advances to step 216.

At step 216, transmit signal strength of the base station is set, and, in some embodiments, the shape of the antenna beams of its transmit antenna structure, to provide communication at a desired quality level at each of the boundary locations of the home network. At step 218, the base station begins operation employing the transmission parameters, and possibly antenna beam characteristics, determined in step 216 to provide authenticated perimeter 105.

Figure 3:
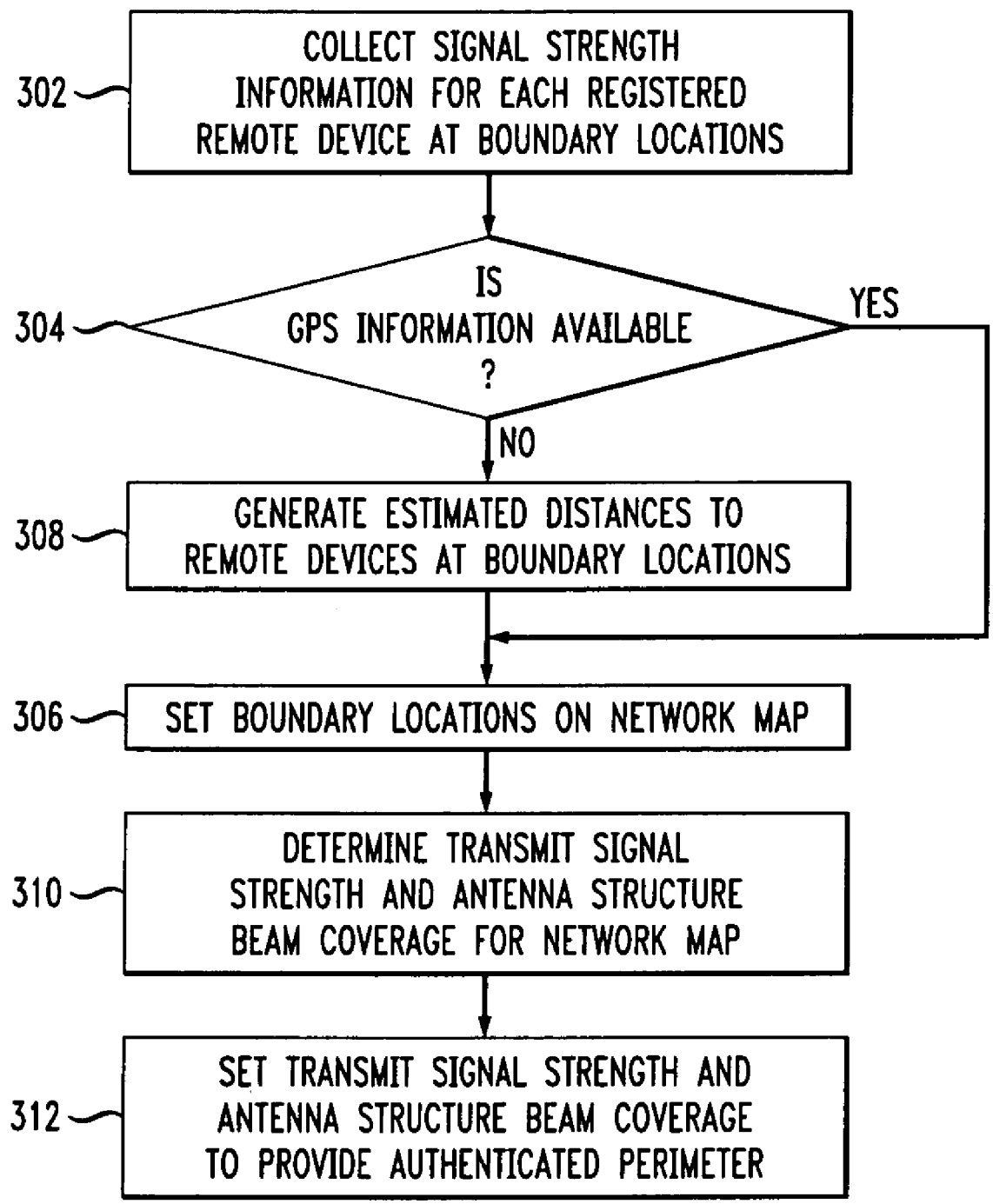
FIG. 3 shows an exemplary method of generating a map for an authenticated perimeter in a network secure area in accordance with an exemplary embodiment of the present invention.

FIG. 3 shows an exemplary method of generating a map for an authenticated perimeter in a network secure area in accordance with an exemplary embodiment of the present invention. The exemplary method of FIG. 3 might be employed in steps 216 and 218 of FIG. 2 for some embodiments.

At step 302, the base station collects signal strength information for each of the selected and registered remote devices and the desired boundary locations of the secure home network. At step 304, a test by the base station determines if GPS information is available for any of the selected and registered remote devices, and, if so, at step 306 the GPS information is employed to set the locations of the registered remote devices on a map of the secure home network. If the test of step 304 determines that GPS information is not available for selected and registered remote devices, then, at step, 308, the base station generates estimates for the distances between the base station and registered devices not having GPS information.

Step 308 might employ techniques as described previously to estimate positions for registered remote devices in the map. Received signal strength and signal transmission delay from each of the registered remote devices might be employed to by base station to generate an estimate of the distances between base station and each of the registered remote devices.

From step 306, the method advances to step 310. Using the map of the secure home network, at step 310, transmit signal strength of the base station is set, and, in some embodiments, the shape of the antenna beams of its transmit antenna structure, to provide communication at a desired quality level at each of the boundary locations of the home network. At step 312, the base station begins operation employing the transmission parameters, and possibly antenna beam characteristics, generated based on the map of the secure home network to provide authenticated perimeter 105.

Embodiments of the present invention might employ calculations for typical link budget for isotropic radiators between two WiFi transceivers in a typical home installation, where one is the base station and the other might be a WiFi enabled remote device. From these calculations, minimum sensitivity of the receiver in the base station transmitter (access point) does not necessarily require the base station to transmit using significant amounts of RF energy.

For example, the path loss between two isotropic antennas is given in equation (1):

$$\text{Path loss } (db) = 20 \log 10(4 \pi d/\lambda), \quad (1)$$

where d=distance and λ=wavelength in same units as distance. 100 feet is about 30 meters, and the wavelength of 915 MHz (the center of the 902-928 MHz band) is 32.8 cm. From equation The path loss is therefore given in equation (2):

$$20 \log 10(4\pi 30/0.328) = 61.2 \text{ dB} \quad (2)$$

The required transmitter power Ptx over a 30 meter path between isotropic antennas to give a received power of −96 dBm is, therefore, as given in equation (3):

$$Ptx(db) = -96 \text{ dBm} + 61.2 \text{ dB} = -34.8 \text{ dBm} \quad (3)$$

(about 331 nanowatts).

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It will be further understood that various changes in the details, materials, and arrangements of the parts which have been described and illustrated in order to explain the nature of this invention may be made by those skilled in the art without departing from the scope of the invention as expressed in the following claims.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard."

We claim:

1. A method of learned power security for a wireless network, the method comprising the steps of:
   transmitting, by a base station, a signal to one or more remote devices at corresponding locations ill an area;
   measuring, by the remote device at each location ill the area, a received signal strength of the signal transmitted by the base station, wherein each location is substantially near all outer boundary of the area;
   communicating to the base station, by the remote device, the received signal strength at the corresponding location of the remote device; and
   defining an authentication perimeter for the area by: (i) setting a transmit signal power of the base station based on the received signal strength at each location, and (ii) configuring one or more antenna characteristics of the base station to define the authentication perimeter, wherein configuring the one or more antenna characteristics modifies a coverage of the base station such that a first transmit signal power level is present at a location of a first remote device, and a second transmit signal power level is present at a location of a second remote device;
   iteratively repeating the transmitting, measuring, and communicating steps until the transmit signal power of the base station reaches a threshold, thereby defining the authentication perimeter;
   estimating, for each corresponding location of the one or more remote devices, a distance between the base station and the location; and
   generating a map of the authentication perimeter defined by the one or more distances between the base station and the corresponding locations of the one or more remote devices.

2. The invention of claim 1, wherein the step of measuring the received signal strength measures at least one of signal power and bit error rate.

3. The invention of claim 1, further comprising the steps of:
   determining, by each remote device, a geographic position of the remote device at each location ha the area;
   communicating to the base station, by each remote device, the geographic position corresponding to the location of the remote device; and
   generating the map of the authentication perimeter based on the one or more corresponding geographic positions of the one or more remote devices.

4. The invention of claim 3, wherein the step of determining, by each remote device, the geographic positions is through the Global Positioning System (GPS).

5. The invention of claim 1, wherein the step of estimating, for each location, the distance between the base station and the location is either (i) based on a received signal strength of a signal transmitted to the base station by the remote device at the corresponding location or (ii) based on a transmit delay of a signal transmitted to the base station by the remote device at the corresponding location.

6. The invention of claim 1, further comprising the steps of:
   measuring, by the base station, signal strength characteristics of a received signal from a remote device; and
   declining permission of the remote device to join the home network when the remote device exhibits signal strength characteristics less than a boundary value for the network secure area.

7. The invention of claim 1, wherein the wireless network operates in conformance with at least one of a family of 802.11 standards.

8. A wireless network having learned power security, the wireless network comprising:
   one or more remote devices at corresponding locations in an area;
   a base station configured to transmit a signal to the one or more remote devices at the corresponding Locations in the area;
   wherein each remote device at a location in the area is configured to (i) measure a received signal strength of the signal transmitted by the base station, each location substantially near an outer boundary of the area and (ii) communicate to the base station the received signal strength at the corresponding location of the remote device, wherein each remote device and the base station are configured to repeat transmitting and measuring the signal, and communicating the transmit signal power to the base station until the transmit signal power of the base station reaches a threshold, thereby defining the authentication ; and
   wherein the base station is configured to define an authentication perimeter for the area by (i) setting a transmit signal power of the base station based on the received signal strength at each location and (ii) configuring one or more antenna characteristics of the base station to define the authentication perimeter, wherein configuring the one or more antenna characteristics modifies a coverage of the base station such that a first transmit signal power level is present at a location of a first remote device, and a second transmit signal power level is present at a location of a second remote device; and
   wherein the base station is configured to (i) estimate, for each location, a distance between the base station and the location and (ii) generate a map of the authentication perimeter defined by the one or more distances between the base station and the corresponding locations of the one or more remote devices.

9. The invention of claim 8, wherein each remote device measures the received signal strength as at least one of signal power and bit error rate.

10. The invention of claim 8, wherein
   each remote device is configured to (i) determine a geographic position of the remote device at each location in the areas and (ii) communication, to the base station, the geographic position corresponding to the location of the remote device; and
   the base station is configured to generate the map of the authentication perimeter based on the one or more corresponding geographic positions of the one or more remote devices.

11. The invention of claim 8, wherein the base station is configured to estimate, for each location, the distance between the base station and the location either (i) based on a received signal strength of a signal transmitted to the base station by the remote device at the corresponding location or (ii) based on a transmit delay of a signal transmitted to the base station by the remote device at the corresponding location.

12. The invention of claim 8, wherein the base station is configured to (i) measure signal strength characteristics of a received signal from a remote device, and (ii)decline permission of the remote device to join the home network when the remote device exhibits signal strength characteristics less than a boundary value for the network secure area.

13. A method of learned power security for a wireless network, the method comprising the steps of:

receiving, by one or more remote devices at corresponding locations ha an area, a signal from a base station;

measuring, by the remote device at each location in the area, a received signal strength of file signal transmitted by the base station, wherein each location is substantially near an outer boundary of the area;

communicating, by each remote device, the received signal strength at the corresponding location of the remote device to the base station for an authentication perimeter for the area; and defining an authentication perimeter for the area by: (i) setting a transmit signal power of the base station based on the received signal strength at each location, and (ii) configuring one or more antenna characteristics of the base station to define the authentication perimeter, wherein configuring the one or more antenna characteristics modifies a coverage of the base station such that a first transmit signal power level is present at a location of a first remote device, and a second transmit signal power level is present at a location of a second remote device; iteratively repeating the transmitting, measuring, and communicating steps until the transmit signal power of the base station reaches a threshold, thereby defining the authentication perimeter;

estimating, for each corresponding location of the one or more remote devices, a distance between the base station and the location; and generating a map of the authentication perimeter defined by the one or more distances between the base station and the corresponding locations of the one or more remote devices.

\* \* \* \* \*